(12) United States Patent
Sopper et al.

(10) Patent No.: US 11,155,351 B2
(45) Date of Patent: Oct. 26, 2021

(54) INFLATABLE PACKAGING FOR USE WITH UAV

(71) Applicant: Wing Aviation LLC, Mountain View, CA (US)

(72) Inventors: Clark Sopper, Redwood City, CA (US); Adam Woodworth, Santa Clara, CA (US)

(73) Assignee: Wing Aviation LLC, Mountain View, CA (US)

( * ) Notice: Subject to any disclaimer, the term of this patent is extended or adjusted under 35 U.S.C. 154(b) by 141 days.

(21) Appl. No.: 16/162,350

(22) Filed: Oct. 16, 2018

(65) Prior Publication Data
US 2019/0047707 A1 Feb. 14, 2019

Related U.S. Application Data

(63) Continuation of application No. 15/046,830, filed on Feb. 18, 2016, now Pat. No. 10,131,428.

(51) Int. Cl.
*B64D 1/08* (2006.01)
*B64C 39/02* (2006.01)
(Continued)

(52) U.S. Cl.
CPC .......... *B64D 1/08* (2013.01); *B64C 27/08* (2013.01); *B64C 39/024* (2013.01); *B65D 65/466* (2013.01); *B65D 77/225* (2013.01); *B65D 81/052* (2013.01); *B65D 81/3888* (2013.01); *G06Q 10/0832* (2013.01); *G08G 5/0004* (2013.01); *G08G 5/0017* (2013.01); *B64C 2201/108* (2013.01); *B64C 2201/128* (2013.01);
(Continued)

(58) Field of Classification Search
CPC .......................... B64C 2201/128; B64D 1/12
See application file for complete search history.

(56) References Cited

U.S. PATENT DOCUMENTS 2,366,741 A 1/1945 Manson
3,745,938 A * 7/1973 Hathaway ................ F41H 5/08
109/49.5

(Continued)

FOREIGN PATENT DOCUMENTS

WO 2016/024276 A1 2/2016

OTHER PUBLICATIONS

Hern, Alex, "DHL launches first commercial drone 'parcelcopter' delivery service," The Guardian, Sep. 25, 2014, 2 pages, http://www.theguardian.com/technology/2014/sep/25/german-dhl-launches-first-commerci . . . .

*Primary Examiner* — Mollie Impink
(74) *Attorney, Agent, or Firm* — McDonnell Boehnen Hulbert & Berghoff LLP

(57) ABSTRACT

An inflatable package enclosure for use on an aerial vehicle including an inflatable exterior chamber, a first inner cavity positioned within the inflatable exterior chamber, an inflation valve positioned on the inflatable exterior chamber, and a handle on the inflatable exterior chamber for securing the inflatable package enclosure to the aerial vehicle, wherein when the inflatable exterior chamber is inflated and when a package is positioned in the first inner cavity, inner surfaces of the inflatable exterior chamber conform to outer surfaces of the package to secure the package within the inflatable exterior chamber.

14 Claims, 12 Drawing Sheets

(51) Int. Cl.

| | |
|---|---|
| *B64C 27/08* | (2006.01) |
| *B65D 77/22* | (2006.01) |
| *B65D 81/38* | (2006.01) |
| *B65D 65/46* | (2006.01) |
| *G08G 5/00* | (2006.01) |
| *G06Q 10/08* | (2012.01) |
| *B65D 81/05* | (2006.01) |

(52) U.S. Cl.
CPC .. *B64C 2201/141* (2013.01); *B64C 2201/146* (2013.01); *G08G 5/0013* (2013.01); *G08G 5/0021* (2013.01); *G08G 5/0026* (2013.01); *G08G 5/0069* (2013.01)

(56) References Cited

U.S. PATENT DOCUMENTS

| | | | |
|---|---|---|---|
| 4,874,093 | A | 10/1989 | Pharo |
| 6,056,119 | A | 5/2000 | Risgalla et al. |
| 6,334,537 | B1 | 1/2002 | Tepper |
| 7,106,202 | B2 | 9/2006 | Dickinson |
| 7,155,854 | B2 | 1/2007 | Dickinson |
| 8,960,436 | B1 | 2/2015 | Smith |
| 9,849,981 | B1 * | 12/2017 | Burgess ............... B64D 1/12 |
| 9,914,539 | B1 * | 3/2018 | Bar-Zeev ............. B64D 1/14 |
| 2003/0006162 | A1 | 1/2003 | Smith |
| 2010/0316461 | A1 | 12/2010 | Huchler |
| 2011/0133036 | A1 | 6/2011 | Goddard et al. |
| 2011/0284417 | A1 | 11/2011 | Duong |
| 2013/0048787 | A1 | 2/2013 | Riley et al. |
| 2017/0203843 | A1 | 7/2017 | Chan et al. |

\* cited by examiner

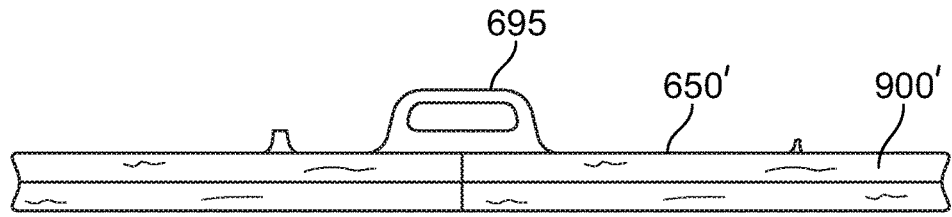

```
┌─────────────────────────────────────────────────────────┐
│ Providing an inflatable package enclosure for use on an │
│ aerial vehicle including an inflatable exterior chamber,│──1402
│ a first inner cavity positioned within the inflatable   │
│ exterior chamber, an inflation valve positioned on the  │
│ inflatable exterior chamber                             │
└─────────────────────────────────────────────────────────┘
                            │
                            ▼
┌─────────────────────────────────────────────────────────┐
│ Positioning a package to be delivered within the first  │──1404
│                     inner cavity                        │
└─────────────────────────────────────────────────────────┘
                            │
                            ▼
┌─────────────────────────────────────────────────────────┐
│ Inflating the inflatable exterior chamber such that inner│
│ surfaces of the inflatable exterior chamber conform to  │──1406
│      outer surfaces of the package to be delivered      │
└─────────────────────────────────────────────────────────┘
                            │
                            ▼
┌─────────────────────────────────────────────────────────┐
│    Securing the inflatable package enclosure to         │──1408
│                   the aerial vehicle                    │
└─────────────────────────────────────────────────────────┘
                            │
                            ▼
┌─────────────────────────────────────────────────────────┐
│        Delivering the package with the aerial vehicle   │──1410
└─────────────────────────────────────────────────────────┘
```

FIG. 14

INFLATABLE PACKAGING FOR USE WITH UAV

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for various different environments. For instance, unmanned vehicles exist for operation in the air, on the ground, underwater, and in space. Examples include quad-copters and tail-sitter UAVs, among others. Unmanned vehicles also exist for hybrid operations in which multi-environment operation is possible. Examples of hybrid unmanned vehicles include an amphibious craft that is capable of operation on land as well as on water or a floatplane that is capable of landing on water as well as on land. Other examples are also possible.

UAVs may be used to carry a load to be delivered. As examples, UAVs may be used to deliver medical equipment and/or supplies to a medical situation, such as an accident scene, or to deliver a package to an individual or business. In operation the payload to be delivered is secured to the UAV and the UAV is then flown to the desired delivery site. Once the UAV arrives at the delivery site, the UAV may land to deliver the payload, or operate in a hover mode and lower the payload from the UAV towards the delivery site.

A payload-release mechanism may be used that releases the payload upon landing at the delivery site. Alternately, a payload-release mechanism may be used that secures a winch line to the payload, where the payload-release mechanism is configured to release the payload from the line when a control system determines that the payload is touching or within a threshold distance from the ground.

When a payload is carried outside of the aircraft or UAV, there are a series of packaging challenges that need to be addressed. The package creates aerodynamic drag on the system. The outer mold line of the package needs to be carefully formed to minimize its aerodynamic impact. A traditional rectangular box creates an undesirable amount of drag.

Furthermore, the package enclosure needs to protect its contents from the environment (temperature, moisture, dirt, insects, impact, etc). A package enclosure on the outside of an aircraft or UAV is subjected to a wide range of environmental conditions. The package enclosure needs to be durable enough to safely contain its cargo.

The package enclosure also requires a firm attachment point to the aircraft or UAV. A package mounted to the exterior of an aircraft affects the flight dynamics of the system and needs to be rigidly mounted so that it does not shift in flight.

In addition, the package contents need to be held in place inside the package enclosure. Shifting contents will affect the aircraft's balance which will affect its flight dynamics

SUMMARY

The present embodiments are directed to an inflatable aerodynamic package enclosure that may be secured underneath an aerial vehicle which may be used to deliver a package contained within the package enclosure to a delivery site. The inflatable package enclosure may include two chambers. The first chamber is an inflatable exterior chamber that when inflated will create an aerodynamic shape. The second chamber is an interior chamber or cavity within the first chamber that is a compartment for the goods or package being carried. Because the second chamber or cavity is inside of the inflatable exterior chamber, when the exterior chamber is inflated and pressurized, the exterior inflatable chamber will expand and inner surfaces thereof will conform to the shape of the goods or package positioned within the inflatable exterior chamber. The inflatable exterior chamber may have a cross-sectional view shaped like an air foil when inflated, or other shape with suitable aerodynamic properties.

In one aspect, an inflatable package enclosure for use on an aerial vehicle is provided including an inflatable exterior chamber, a first inner cavity positioned within the inflatable exterior chamber, and an inflation valve positioned on the inflatable exterior chamber, wherein when the inflatable exterior chamber is inflated and when a package is positioned in the first inner cavity, inner surfaces of the inflatable exterior chamber conform to outer surfaces of the package to secure the package within the inflatable exterior chamber.

In another aspect, a method of securing a package for delivery with an aerial vehicle is provided including the steps of (i) providing an inflatable package enclosure for use on an aerial vehicle having an inflatable exterior chamber, a first inner cavity positioned within the inflatable exterior chamber, and an inflation valve positioned on the inflatable exterior chamber; (ii) positioning a package to be delivered within the first inner cavity; (iii) inflating the inflatable exterior chamber such that inner surfaces of the inflatable exterior chamber conform to outer surfaces of the package to be delivered; (iv) securing the inflatable package enclosure to the aerial vehicle; and (v) delivering the package with the aerial vehicle.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 13 is a side cross-sectional view of inflatable package enclosure 650' shown in FIGS. 11 and 12 shown in an uninflated state.

FIG. 14 is an example method.

DETAILED DESCRIPTION

Figure 1:
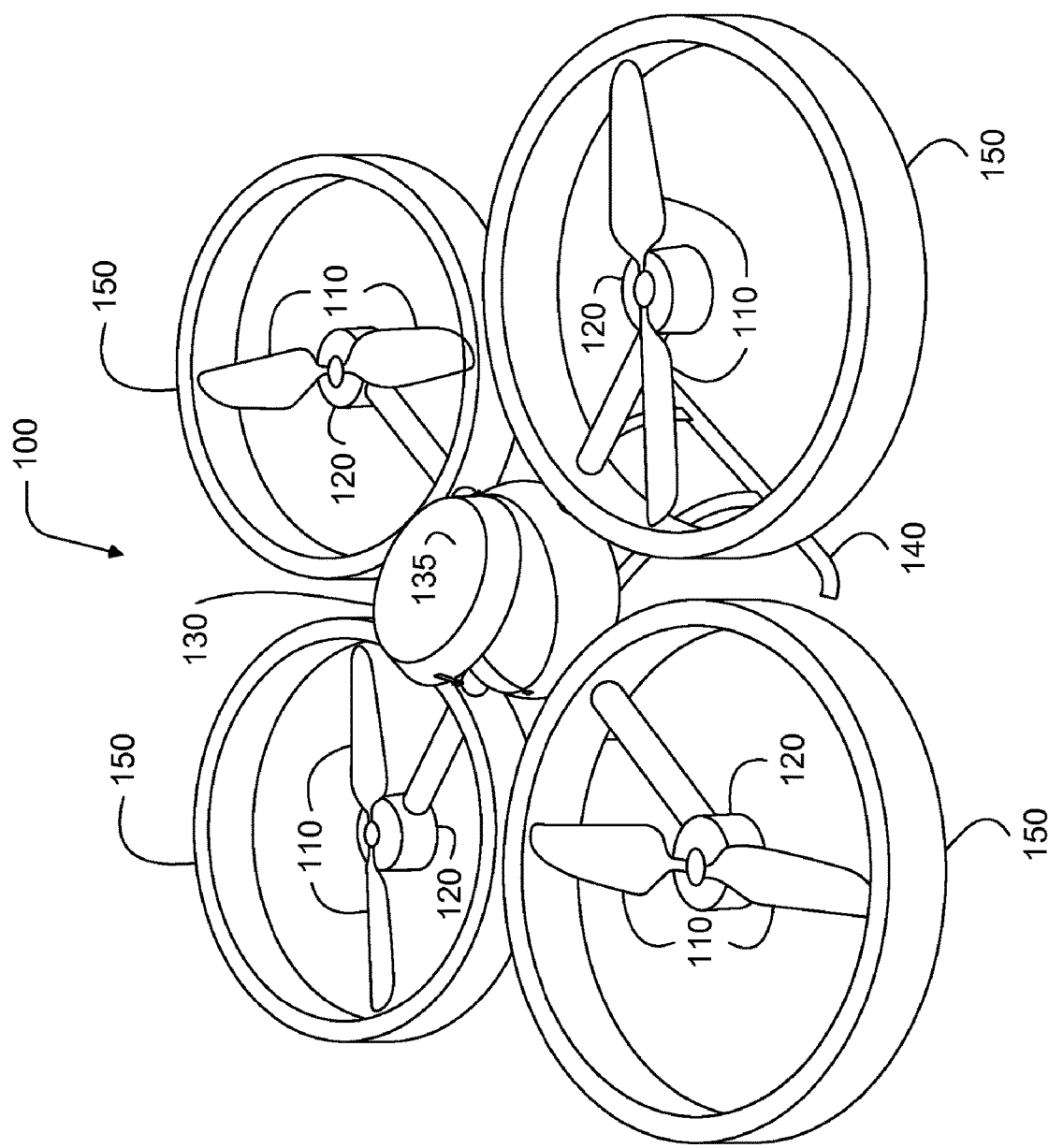
FIGS. 1, 2, 3A, and 3B are simplified illustrations of unmanned aerial vehicles, according to example embodiments.

The following detailed description describes various features and functions of the disclosure with reference to the accompanying Figures. In the Figures, similar symbols typically identify similar components, unless context dictates otherwise. The illustrative systems described herein are not meant to be limiting. It will be readily understood that certain aspects of the disclosure can be arranged and combined in a wide variety of different configurations, all of which are contemplated herein.

I. Overview

Example embodiments are directed to an inflatable package enclosure used to enclose a package to be delivered within the inflatable package enclosure. The inflatable package is designed to be secured beneath an aerial vehicle and may have a suitable aerodynamic shape so as not to unduly affect the flight dynamics of the aerial vehicle.

The present embodiments are directed to an inflatable aerodynamic package enclosure. The inflatable package enclosure may include two chambers. The first chamber is an inflatable exterior chamber that when inflated will create an aerodynamic shape. The second chamber is an interior chamber or cavity within the first chamber that is a compartment for the goods or package being carried. Because the second chamber or cavity is inside of the inflatable exterior chamber, when the exterior chamber is inflated and pressurized, the exterior inflatable chamber will expand and inner surfaces thereof will conform to the shape of the goods or package positioned within the inflatable exterior chamber. The inflatable exterior chamber may have a cross-sectional view shaped like an air foil when inflated, or other shape with suitable aerodynamic properties.

The inflatable package enclosure can be created out of any airtight film such as polyurethane, textile, or fabric such as ripstop nylon. The package enclosure could be pressurized once and then hold pressure or it could be actively pressurized during flight by forcing air through the aircraft or UAV into the inflatable package enclosure as the aircraft or UAV moves through the air.

The pressurized inflatable package enclosure will hold the contents firmly in place. The air space around the contents within the inflated package enclosure will provide thermal insulation for the package within. The inflated package enclosure will also provide protection from impact, cushioning the package when the inflated package enclosure is released or lowered from the aircraft or UAV to the ground. When inflated, the outer form of the package enclosure will be a rigid aerodynamic body. When deflated, the package enclosure will take up very little volume and space, as it will lie flat.

The inflatable package enclosure provides a number of advantages over conventional payload designs. In particular, the inflatable package enclosure provides for a large aerodynamic volume using a minimal amount of material, such that when deflated the inflatable package enclosure packs extremely flat. In addition, the inflatable package enclosure provides thermal insulation for the contents of the enclosure and also provides impact protection for the contents of the enclosure upon delivery to the ground. Further, the inflatable package enclosure actively holds the contents of the enclosure in place within the enclosure.

Using an inflatable package enclosure allows the aircraft/package system to have an optimal exterior form for aerodynamic efficiency (which reduces energy needed to power the aircraft) while simultaneously allowing the packaging to be extremely minimal for both merchant storage and end user disposal.

The inflatable package enclosure uses air for both structure and insulation. The use of air in this manner allows the package to be rigid and thermally insulated without having to carry wasteful insulation or structural material. This reduces flight mass, packaging cost, storage space required, and material that gets disposed of.

The inflatable package enclosure may include a plurality of inner chambers or cavities used to contain a plurality of packages within the enclosure. In some embodiments, the inflatable package enclosure may include a plurality of sectioned portions, such that if there is a failure in one section of the inflatable package enclosure, only a single section would become deflated, and the remaining sections would remain intact to maintain the package within the enclosure and retain an aerodynamic shape.

Further in some embodiments, the inflatable enclosure may be made of paper, or the inflatable section could be covered in a fabric such as ripstop nylon. The fabric itself could be airtight, or it could include a coating such that the fabric used for the inflatable package enclosure is airtight.

Moreover, the inflatable package enclosure may include an exterior pocket similar to that used on letters or boxes that are mailed, and may be used to store information regarding the contents of the enclosure. The exterior pocket could also be used to enclose a contents identifier, an RFID tag for identifying the contents within the enclosure, or other devices such as moisture meters, impact detectors, etc. to provide further information regarding the contents within the enclosure, or details of the flight.

II. Illustrative Unmanned Vehicles

Herein, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 100 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself by adjusting the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
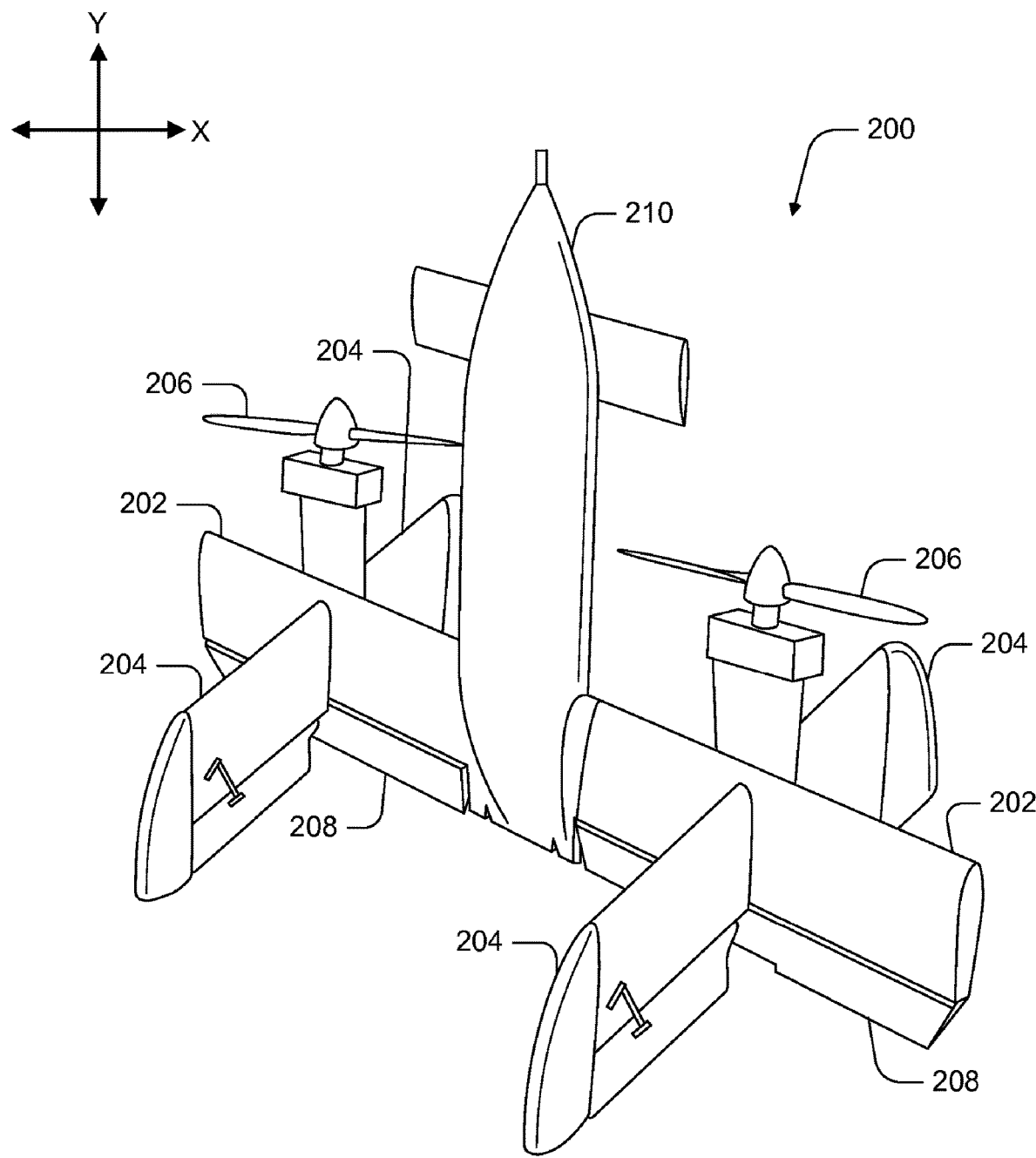

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
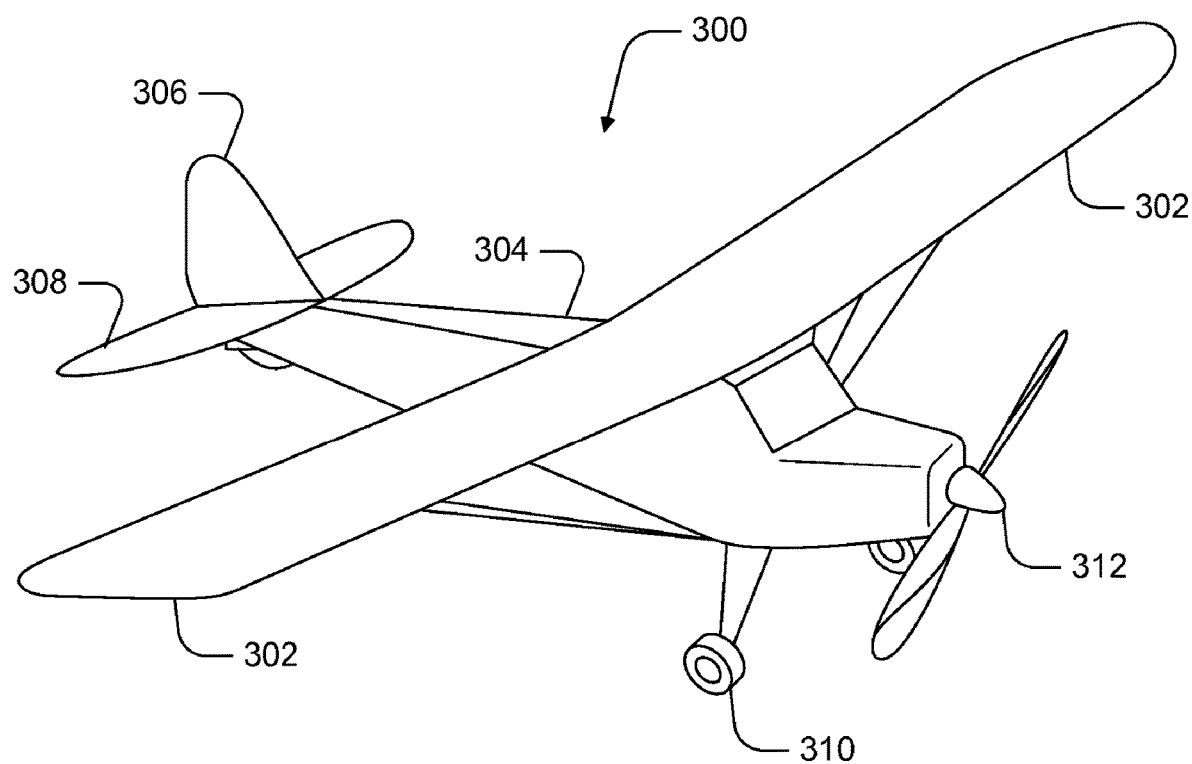

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, and propeller.

Figure 3B:
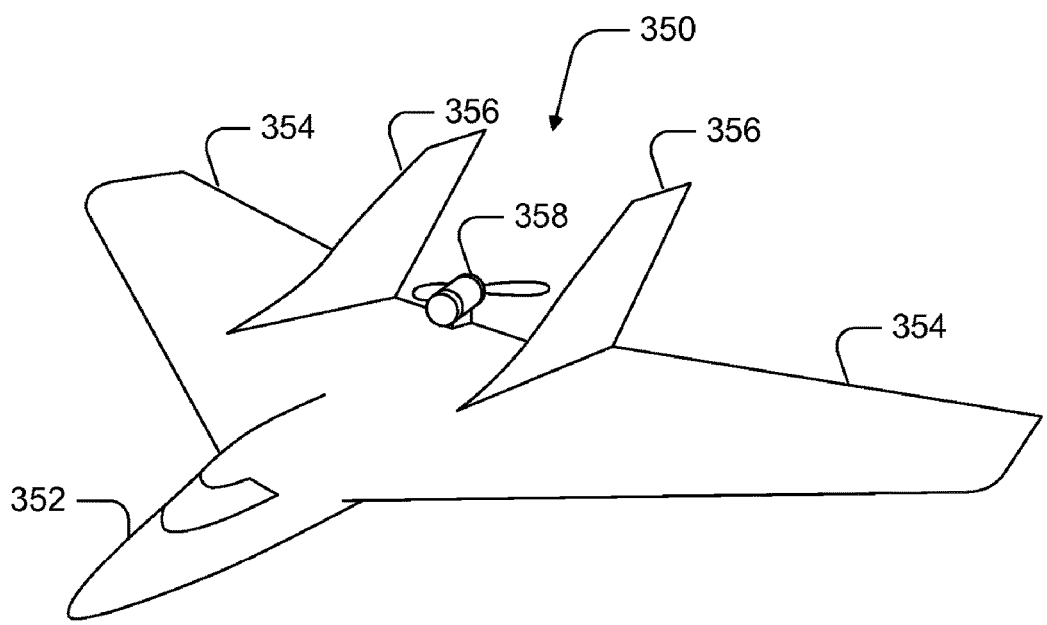

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, and propeller.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle is exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

In a further aspect, various other types of unmanned vehicles may be utilized to provide services such as delivery services, remote medical support, and so on. Such vehicles may include, for example, unmanned ground vehicles (UGVs), unmanned space vehicles (USVs), and/or unmanned underwater vehicles (UUVs). A UGV may be a vehicle which is capable of sensing its own environment and navigating surface-based terrain without input from a driver. Examples of UGVs include watercraft, cars, trucks, buggies, motorcycles, treaded vehicles, and retrieval duck decoys, among others. A UUV is a vehicle that is capable of sensing its own environment and navigating underwater on its own, such as a submersible vehicle. Other types of unmanned vehicles are possible as well.

III. Illustrative UAV Systems

Figure 4:
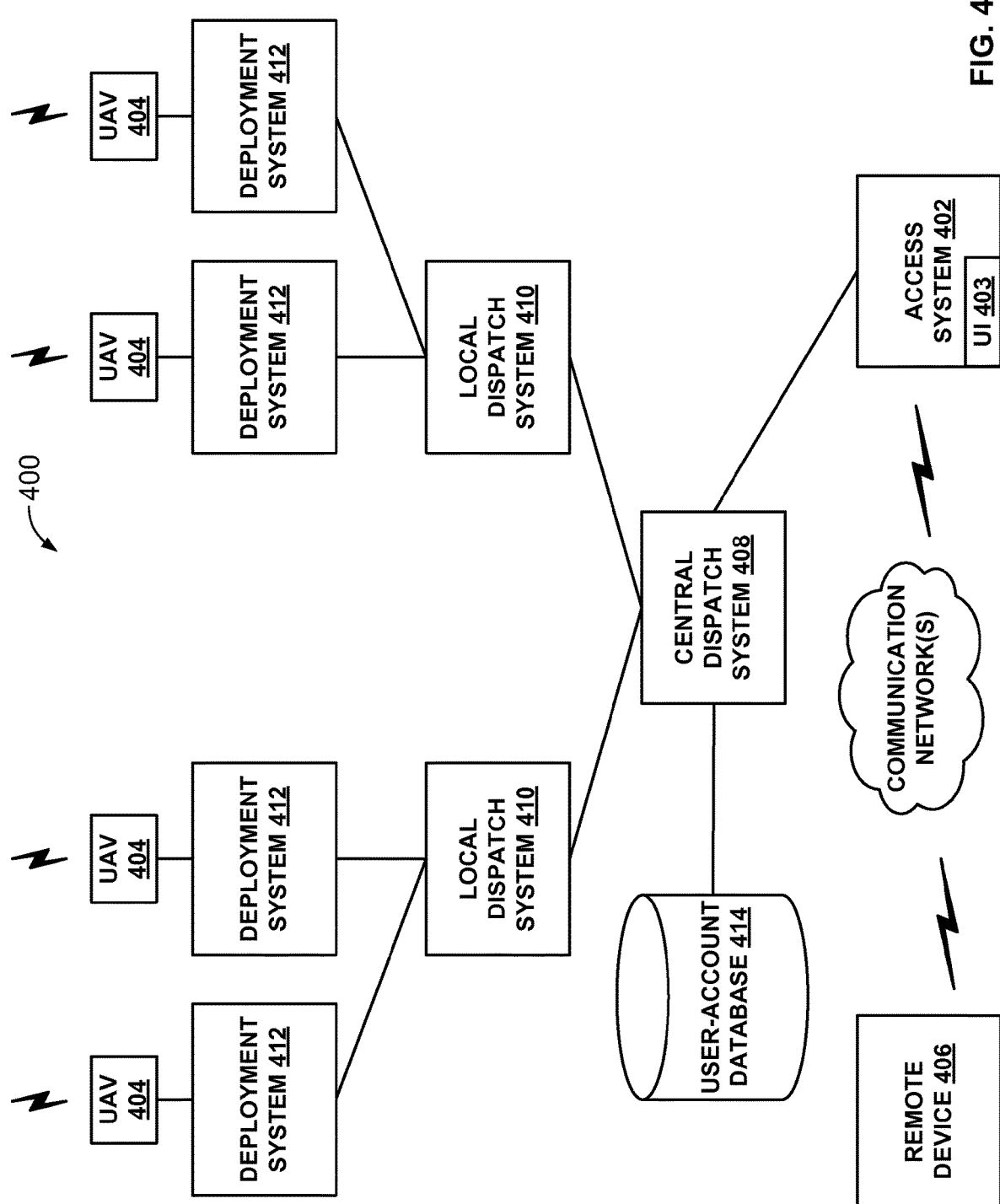
FIG. 4 is a simplified block diagram illustrating a network of unmanned aerial vehicles, according to an example embodiment.

UAV systems may be implemented in order to provide various services. In particular, UAVs may be provided at a number of different launch sites, which may be in communication with regional and/or central control systems. Such a distributed UAV system may allow UAVs to be quickly deployed to provide services across a large geographic area (e.g., that is much larger than the flight range of any single UAV). For example, UAVs capable of carrying payloads may be distributed at a number of launch sites across a large geographic area (possibly even throughout an entire country, or even worldwide), in order to deliver various items to locations throughout the geographic area. As another example, a distributed UAV system may be provided in order to provide remote medical support, via UAVs. FIG. 4 is a simplified block diagram illustrating a distributed UAV system 400, according to an example embodiment.

In an illustrative UAV system 400, an access system 402 may allow for interaction with, control of, and/or utilization of a network of UAVs 404. In some embodiments, an access system 402 may be a computing system that allows for human-controlled dispatch of UAVs 404. As such, the control system may include or otherwise provide a user interface (UI) via which a user can access and/or control UAVs 404. In some embodiments, dispatch of UAVs 404 may additionally or alternatively be accomplished via one or more automated processes.

Further, an access system 402 may provide for remote operation of a UAV. For instance, an access system 402 may allow an operator to control the flight of a UAV via user interface (UI). As a specific example, an operator may use an access system to dispatch a UAV 404 to deliver a package to a target location, or to travel to the location of a medical situation with medical-support items. The UAV 404 may then autonomously navigate to the general area of the target location. At this point, the operator may use the access system 402 to take over control of the UAV 404, and navigate the UAV to the target location (e.g., to a particular person to whom a package is being sent). Other examples of remote operation of a UAV are also possible.

In an illustrative embodiment, UAVs 404 may take various forms. For example, each UAV 404 may be a UAV such as those illustrated in FIGS. 1, 2, 3A, and 3B. However, UAV system 400 may also utilize other types of UAVs without departing from the scope of the invention. In some implementations, all UAVs 404 may be of the same or a similar configuration. However, in other implementations, UAVs 404 may include a number of different types of UAVs. For instance, UAVs 404 may include a number of types of UAVs, with each type of UAV being configured for a different type or types of medical support.

A remote device 406 may take various forms. Generally, a remote device 406 may be any device via which a direct or indirect request to dispatch UAV can be made. (Note that an indirect request may involve any communication that may be responded to by dispatching a UAV; e.g., requesting a package delivery, or sending a request for medical support). In an example embodiment, a remote device 406 may be a mobile phone, tablet computer, laptop computer, personal computer, or any network-connected computing device. Further, in some instances, remote device 406 may not be a computing device. As an example, a standard telephone, which allows for communication via plain old telephone service (POTS), may serve as a remote device 406. Other types of remote devices are also possible.

Further, a remote device 406 may be configured to communicate with access system 402 via one or more types of communication network(s). For example, a remote device 406 could communicate with access system 402 (or via a human operator of the access system) by placing a phone call over a POTS network, a cellular network, and/or a data network such as the Internet. Other types of networks may also be utilized.

In some embodiments, a remote device 406 may be configured to allow a user to request delivery of one or more items to a desired location. For example, a user could request UAV delivery of a package to their home via their mobile phone, tablet, or laptop. As another example, a user could request dynamic delivery to whatever location they are at at the time of delivery. To provide such dynamic delivery, a UAV system 400 may receive location information (e.g., GPS coordinates, etc.) from the user's mobile phone, or any other device on the user's person, such that a UAV can navigate to the user's location (as indicated by their mobile phone).

In some embodiments, a remote device 406 may be configured to allow a user to request medical support. For example, a person may use their mobile phone, a POTS phone, or a VoIP phone, to place an emergency call (e.g., a 9-1-1 call) and request that medical support be provided at the scene of an accident. Further, note that a request for medical support need not be explicit. For instance, a person may place a 9-1-1 call to report an emergency situation. When the 9-1-1 operator receives such a call, the operator may evaluate the information that is provided and decide that medical support is appropriate. Accordingly, the operator may use an access system 402 to dispatch a UAV 404.

As noted, a remote device 406 may be configured to determine and/or provide an indication of its own location. For example, remote device 406 may include a GPS system so that it can include GPS location information (e.g., GPS coordinates) in a communication to an access system 402 and/or to a dispatch system such as central dispatch system 408. As another example, a remote device 406 may use a technique that involves triangulation (e.g., between base stations in a cellular network) to determine its location. Alternatively, another system such as a cellular network may use a technique that involves triangulation to determine the location of a remote device 406, and then send a location message to the remote device 406 to inform the remote device of its location. Other location-determination techniques are also possible.

In an illustrative arrangement, central dispatch system 408 may be a server or group of servers, which is configured to receive dispatch messages requests and/or dispatch instructions from an access system 402. Such dispatch messages may request or instruct the central dispatch system 408 to coordinate the deployment of UAVs to various target locations. A central dispatch system 408 may be further configured to route such requests or instructions to local dispatch systems 410. To provide such functionality, central dispatch system 408 may communicate with access system 402 via a data network, such as the Internet or a private network that is established for communications between access systems and automated dispatch systems.

In the illustrated configuration, central dispatch system 408 may be configured to coordinate the dispatch of UAVs 404 from a number of different local dispatch systems 410. As such, central dispatch system 408 may keep track of which UAVs 404 are located at which local dispatch systems 410, which UAVs 404 are currently available for deployment, and/or which services or operations each of the UAVs 404 is configured for (in the event that a UAV fleet includes multiple types of UAVs configured for different services and/or operations). Additionally or alternatively, each local dispatch system 410 may be configured to track which of its associated UAVs 404 are currently available for deployment and/or which services or operations each of its associated UAVs is configured for.

In some cases, when central dispatch system 408 receives a request for UAV-related service from an access system 402, central dispatch system 408 may select a specific UAV 404 to dispatch. The central dispatch system 408 may accordingly instruct the local dispatch system 410 that is associated with the selected UAV to dispatch the selected UAV. The local dispatch system 410 may then operate its associated deployment system 412 to launch the selected UAV. In other cases, a central dispatch system 408 may forward a request for a UAV-related service to a local dispatch system 410 that is near the location where the support is requested, and leave the selection of a particular UAV 404 to the local dispatch system 410.

In an example configuration, a local dispatch system 410 may be implemented in a computing system at the same location as the deployment system or systems 412 that it controls. For example, in some embodiments, a local dispatch system 410 could be implemented by a computing system at a building, such as a fire station, where the deployment systems 412 and UAVs 404 that are associated with the particular local dispatch system 410 are also located. In other embodiments, a local dispatch system 410 could be implemented at a location that is remote to its associated deployment systems 412 and UAVs 404.

Numerous variations on and alternatives to the illustrated configuration of UAV system 400 are possible. For example, in some embodiments, a user of a remote device 406 could request medical support directly from a central dispatch system 408. To do so, an application may be implemented on a remote device 406 that allows the user to provide information regarding a requested service, and generate and send a data message to request that the UAV system provide the service. In such an embodiment, central dispatch system 408 may include automated functionality to handle requests that are generated by such an application, evaluate such requests, and, if appropriate, coordinate with an appropriate local dispatch system 410 to deploy a UAV.

Further, in some implementations, some or all of the functionality that is attributed herein to central dispatch system 408, local dispatch system(s) 410, access system 402, and/or deployment system(s) 412 could be combined in a single system, implemented in a more complex system, and/or redistributed among central dispatch system 408, local dispatch system(s) 410, access system 402, and/or deployment system(s) 412 in various ways.

Yet further, while each local dispatch system 410 is shown as having two associated deployment systems, a given local dispatch system 410 may have more or less associated deployment systems. Similarly, while central dispatch system 408 is shown as being in communication with two local dispatch systems 410, a central dispatch system may be in communication with more or less local dispatch systems 410.

In a further aspect, a deployment system 412 may take various forms. In general, a deployment system may take the form of or include a system for physically launching a UAV 404. Such a launch system may include features that allow for a human-assisted UAV launch and/or features that provide for an automated UAV launch. Further, a deployment system 412 may be configured to launch one particular UAV 404, or to launch multiple UAVs 404.

A deployment system 412 may further be configured to provide additional functions, including for example, diagnostic-related functions such as verifying system functionality of the UAV, verifying functionality of devices that are housed within a UAV (e.g., such as a defibrillator, a mobile phone, or an HMD), and/or maintaining devices or other items that are housed in the UAV (e.g., by charging a defibrillator, mobile phone, or HMD, or by checking that medicine has not expired).

In some embodiments, the deployment systems 412 and their corresponding UAVs 404 (and possibly associated local dispatch systems 410) may be strategically distributed throughout an area such as a city. For example, deployment systems 412 may be located on the roofs of certain municipal buildings, such as fire stations, which can thus serve as the dispatch locations for UAVs 404. Fire stations may function well for UAV dispatch, as fire stations tend to be distributed well with respect to population density, their roofs tend to be flat, and the use of firehouse roofs as leased spaces for UAV dispatch could further the public good. However, deployment systems 412 (and possibly the local dispatch systems 410) may be distributed in other ways, depending upon the particular implementation. As an additional example, kiosks that allow users to transport packages via UAVs may be installed in various locations. Such kiosks may include UAV launch systems, and may allow a user to provide their package for loading onto a UAV and pay for UAV shipping services, among other possibilities. Other examples are also possible.

In a further aspect, a UAV system 400 may include or have access to a user-account database 414. The user-account database 414 may include data for a number of user-accounts, and which are each associated with one or more person. For a given user-account, the user-account database 414 may include data related to or useful in providing UAV-related services. Typically, the user data associated with each user-account is optionally provided by an associated user and/or is collected with the associated user's permission.

Further, in some embodiments, a person may have to register for a user-account with the UAV system 400 in order to use or be provided with UAV-related services by the UAVs 404 of UAV system 400. As such, the user-account database 414 may include authorization information for a given user-account (e.g., a user-name and password), and/or other information that may be used to authorize access to a user-account.

In some embodiments, a person may associate one or more of their devices with their user-account, such that they can be provided with access to the services of UAV system 400. For example, when a person uses an associated mobile phone to, e.g., place a call to an operator of access system 402 or send a message requesting a UAV-related service to a dispatch system, the phone may be identified via a unique device identification number, and the call or message may then be attributed to the associated user-account. Other examples are also possible.

IV. Illustrative Components of a UAV

Figure 5:
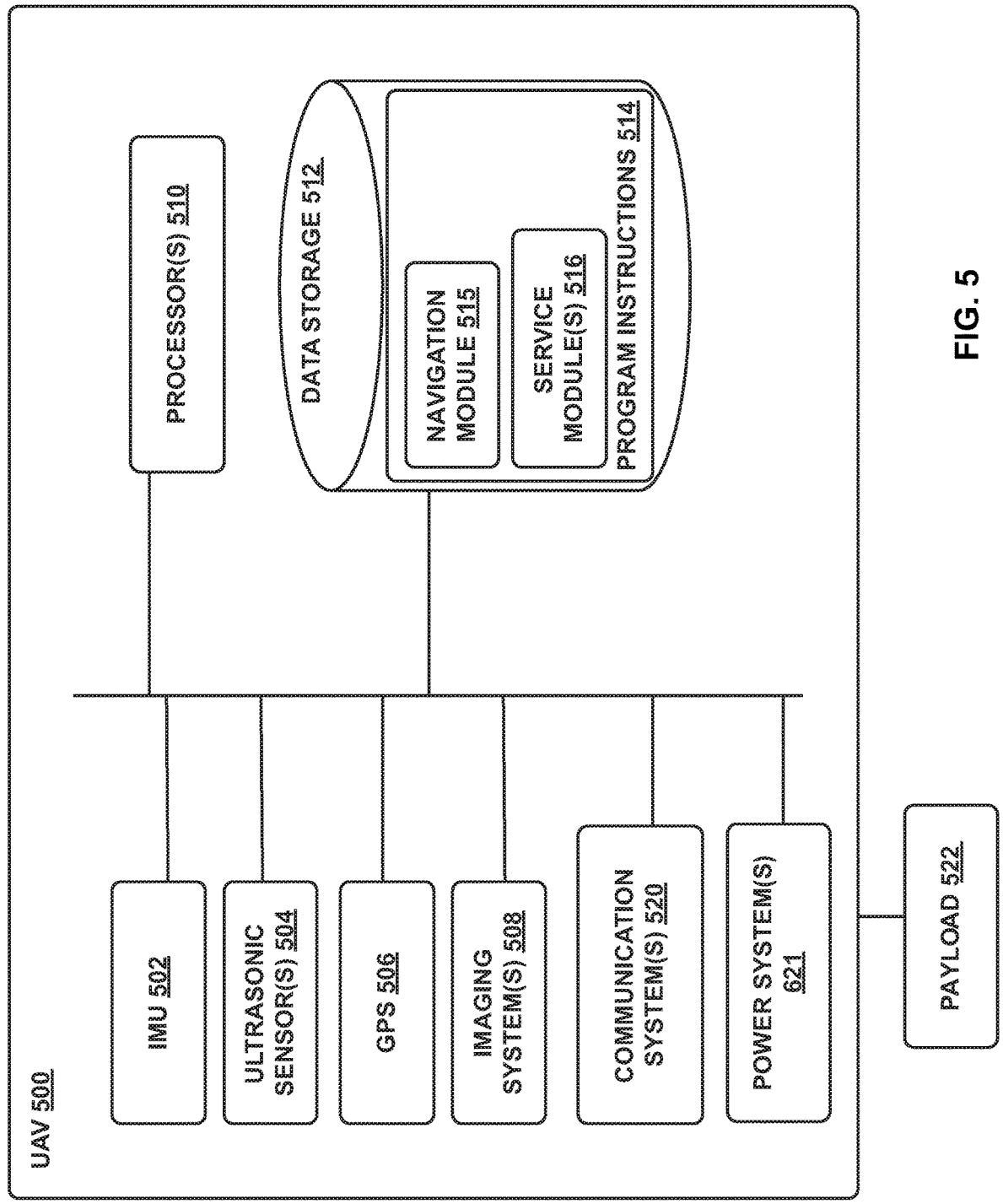
FIG. 5 is a simplified block diagram illustrating components of an unmanned aerial vehicle, according to an example embodiment.

FIG. 5 is a simplified block diagram illustrating components of a UAV 500, according to an example embodiment. UAV 500 may take the form of or be similar in form to one of the UAVs 100, 200, 300, and 350 shown in FIGS. 1, 2, 3A, and 3B. However, a UAV 500 may also take other forms.

UAV 500 may include various types of sensors, and may include a computing system configured to provide the functionality described herein. In the illustrated embodiment, the sensors of UAV 500 include an inertial measurement unit (IMU) 502, ultrasonic sensor(s) 504, GPS 506, imaging system(s) 508, among other possible sensors and sensing systems.

In the illustrated embodiment, UAV 500 also includes one or more processors 510. A processor 510 may be a general-purpose processor or a special purpose processor (e.g., digital signal processors, application specific integrated circuits, etc.). The one or more processors 510 can be configured to execute computer-readable program instructions 514 that are stored in the data storage 512 and are executable to provide the functionality of a UAV described herein.

The data storage 512 may include or take the form of one or more computer-readable storage media that can be read or accessed by at least one processor 510. The one or more computer-readable storage media can include volatile and/or non-volatile storage components, such as optical, magnetic, organic or other memory or disc storage, which can be integrated in whole or in part with at least one of the one or more processors 510. In some embodiments, the data storage 512 can be implemented using a single physical device (e.g., one optical, magnetic, organic or other memory or disc storage unit), while in other embodiments, the data storage 512 can be implemented using two or more physical devices.

As noted, the data storage 512 can include computer-readable program instructions 514 and perhaps additional data, such as diagnostic data of the UAV 500. As such, the data storage 514 may include program instructions to perform or facilitate some or all of the UAV functionality described herein. For instance, in the illustrated embodiment, program instructions 514 include a navigation module 515 and one or more service modules 516.

A. Sensors

In an illustrative embodiment, IMU 502 may include both an accelerometer and a gyroscope, which may be used together to determine the orientation of the UAV 500. In particular, the accelerometer can measure the orientation of the vehicle with respect to earth, while the gyroscope measures the rate of rotation around an axis. IMUs are commercially available in low-cost, low-power packages.

For instance, an IMU 502 may take the form of or include a miniaturized MicroElectroMechanical System (MEMS) or a NanoElectroMechanical System (NEMS). Other types of IMUs may also be utilized.

An IMU 502 may include other sensors, in addition to accelerometers and gyroscopes, which may help to better determine position and/or help to increase autonomy of the UAV 500. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 500, slight errors in measurement may compound over time and result in a more significant error. However, an example UAV 500 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 500 may also include a pressure sensor or barometer, which can be used to determine the altitude of the UAV 500. Alternatively, other sensors, such as sonic altimeters or radar altimeters, can be used to provide an indication of altitude, which may help to improve the accuracy of and/or prevent drift of an IMU.

In a further aspect, UAV 500 may include one or more sensors that allow the UAV to sense objects in the environment. For instance, in the illustrated embodiment, UAV 500 includes ultrasonic sensor(s) 504. Ultrasonic sensor(s) 504 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 500 also includes a GPS receiver 506. The GPS receiver 506 may be configured to provide data that is typical of well-known GPS systems, such as the GPS coordinates of the UAV 500. Such GPS data may be utilized by the UAV 500 for various functions. As such, the UAV may use its GPS receiver 506 to help navigate to the caller's location, as indicated, at least in part, by the GPS coordinates provided by their mobile device.

Other examples are also possible.

UAV 500 may also include one or more imaging system (s) 508. For example, one or more still and/or video cameras may be utilized by a UAV 500 to capture image data from the UAV's environment. As a specific example, charge-coupled device (CCD) cameras or complementary metal-oxide-semiconductor (CMOS) cameras can be used with unmanned vehicles. Such imaging sensor(s) 508 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 500 may use its one or more imaging system 508 to help in determining location. For example, UAV 500 may capture imagery of its environment and compare it to what it expects to see in its environment given current estimated position (e.g., its current GPS coordinates), and refine its estimate of its position based on this comparison.

In a further aspect, UAV 500 may include one or more microphones. Such microphones may be configured to capture sound from the UAVs environment.

B. Navigation and Location Determination

The navigation module 515 may provide functionality that allows the UAV 500 to, e.g., move about in its environment and reach a desired location. To do so, the navigation module 515 may control the altitude and/or direction of flight by controlling the mechanical features of the UAV that affect flight (e.g., rotors 110 of UAV 100).

In order to navigate the UAV 500 to a target location, a navigation module 515 may implement various navigation techniques, such as map-based navigation and localization-based navigation, for instance. With map-based navigation, the UAV 500 may be provided with a map of its environment, which may then be used to navigate to a particular location on the map. With localization-based navigation, the UAV 500 may be capable of navigating in an unknown environment using localization. Localization-based navigation may involve a UAV 500 building its own map of its environment and calculating its position within the map and/or the position of objects in the environment. For example, as a UAV 500 moves throughout its environment, the UAV 500 may continuously use localization to update its map of the environment. This continuous mapping process may be referred to as simultaneous localization and mapping (SLAM). Other navigation techniques may also be utilized.

In some embodiments, the navigation module 515 may navigate using a technique that relies on waypoints. In particular, waypoints are sets of coordinates that identify points in physical space. For instance, an air-navigation waypoint may be defined by a certain latitude, longitude, and altitude. Accordingly, navigation module 515 may cause UAV 500 to move from waypoint to waypoint, in order to ultimately travel to a final destination (e.g., a final waypoint in a sequence of waypoints).

In a further aspect, navigation module 515 and/or other components and systems of UAV 500 may be configured for "localization" to more precisely navigate to the scene of a medical situation. More specifically, it may be desirable in certain situations for a UAV to be close to the person to whom an item is being delivered by a UAV (e.g., within reach of the person). To this end, a UAV may use a two-tiered approach in which it uses a more-general location-determination technique to navigate to a target location or area that is associated with the medical situation, and then use a more-refined location-determination technique to identify and/or navigate to the target location within the general area.

For example, a UAV 500 may navigate to the general area of a person to whom an item is being delivered using waypoints. Such waypaints may be pre-determined based on GPS coordinates provided by a remote device at the target delivery location. The UAV may then switch to a mode in which it utilizes a localization process to locate and travel to a specific location of the person in need. For instance, if a person is having a heart attack at a large stadium, a UAV 500 carrying a medical package may need to be within reach of the person or someone near the person so that the can take items from the package. However, a GPS signal may only get a UAV so far, e.g., to the stadium. A more precise location-determination technique may then be used to find the specific location of the person within the stadium.

Various types of location-determination techniques may be used to accomplish localization of a person or a device once a UAV 500 has navigated to the general area of the person or device. For instance, a UAV 500 may be equipped with one or more sensory systems, such as, for example, imaging system(s) 508, a directional microphone array (not shown), ultrasonic sensors 504, infrared sensors (not shown), and/or other sensors, which may provide input that the navigation module 515 utilizes to navigate autonomously or semi-autonomously to the specific location of a person.

As another example, once the UAV 500 reaches the general area of a target delivery location (or of a moving subject such as a person or their mobile device), the UAV 500 may switch to a "fly-by-wire" mode where it is controlled, at least in part, by a remote operator, who can navigate the UAV 500 to the specific location of the person in need. To this end, sensory data from the UAV 500 may be sent to the remote operator to assist them in navigating the UAV to the specific location. For example, the UAV 500 may stream a video feed or a sequence of still images from the UAV's imaging system(s) 508. Other examples are possible.

As yet another example, the UAV 500 may include a module that is able to signal to a passer-by for assistance in either reaching the specific target delivery location; for example, a UAV may displaying a visual message requesting such assistance in a graphic display, play an audio message or tone through speakers to indicate the need for such assistance, among other possibilities. Such a visual or audio message might indicate that assistance is needed in delivering the UAV 500 to a particular person or a particular location, and might provide information to assist the passer-by in delivering the UAV 500 to the person or location (e.g., a description or picture of the person or location, and/or the person or location's name), among other possibilities. Such a feature can be useful in a scenario in which the UAV is unable to use sensory functions or another location-determination technique to determine the specific location of the person. However, this feature is not limited to such scenarios.

In some embodiments, once a UAV 500 arrives at the general area of a person who requested service and/or at the general area that includes a target delivery location, the UAV may utilize a beacon from a user's remote device (e.g., the user's mobile phone) to locate the person. Such a beacon may take various forms. As an example, consider the scenario where a remote device, such as the mobile phone of a person who requested a UAV delivery, is able to send out directional signals (e.g., an RF signal, a light signal and/or an audio signal). In this scenario, the UAV may be configured to navigate by "sourcing" such directional signals—in other words, by determining where the signal is strongest and navigating accordingly. As another example, a mobile device can emit a frequency, either in the human range or outside the human range, and the UAV can listen for that frequency and navigate accordingly. As a related example, if the UAV is listening for spoken commands, then the UAV could utilize spoken statements, such as "Help! I'm over here!" to source the specific location of the person in need of medical assistance.

In an alternative arrangement, a navigation module may be implemented at a remote computing device, which communicates wirelessly with the UAV. The remote computing device may receive data indicating the operational state of the UAV, sensor data from the UAV that allows it to assess the environmental conditions being experienced by the UAV, and/or location information for the UAV. Provided with such information, the remote computing device may determine altitudinal and/or directional adjustments that should be made by the UAV and/or may determine how the UAV should adjust its mechanical features (e.g., rotors 110 of UAV 100) in order to effectuate such movements. The remote computing system may then communicate such adjustments to the UAV so it can move in the determined manner.

C. Communication Systems

In a further aspect, UAV 500 includes one or more communication systems 520. The communications systems 520 may include one or more wireless interfaces and/or one or more wireline interfaces, which allow UAV 500 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

In an example embodiment, a UAV 500 may include communication systems 520 that allow for both short-range communication and long-range communication. For example, the UAV 500 may be configured for short-range communications using Bluetooth and for long-range communications under a CDMA protocol. In such an embodiment, the UAV 500 may be configured to function as a "hot spot;" or in other words, as a gateway or proxy between a remote support device and one or more data networks, such as cellular network and/or the Internet. Configured as such, the UAV 500 may facilitate data communications that the remote support device would otherwise be unable to perform by itself.

For example, UAV 500 may provide a WiFi connection to a remote device, and serve as a proxy or gateway to a cellular service provider's data network, which the UAV might connect to under an LTE or a 3G protocol, for instance. The UAV 500 could also serve as a proxy or gateway to a high-altitude balloon network, a satellite network, or a combination of these networks, among others, which a remote device might not be able to otherwise access.

D. Power Systems

In a further aspect, UAV 500 may include power system (s) 521. A power system 521 may include one or more batteries for providing power to the UAV 500. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 500 may employ various systems and configurations in order to transport items. In the illustrated embodiment, a payload 522 may serve as a compartment that can hold one or more items, such that a UAV 500 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible. In some implementations, the payload 522 of a given UAV 500 may include or take the form of a "package" designed to transport medical-support items to a target delivery location. For example, a medical-support UAV may include a package with one or more items for medical support in the particular medical situation, and/or one or more medical-support modules 516 that are designed to provide medical support in the particular medical situation. In some cases, a UAV 500 may include a package that is designed for a particular medical situation such as choking, cardiac arrest, shock, asthma, drowning, etc. In other cases, a UAV 500 may include a package that is designed for a number of different medical situations, which may be associated in some way.

Such medical support items may aid in diagnosing and/or treating a person who needs medical assistance, or may serve other purposes. Example of medical-support items include, but are not limited to: (a) medicines, (b) diagnostic devices, such as a pulse oximeter, blood pressure sensor, or EKG sensor, (c) treatment devices, such as an EpiPen, a first aid kit, or various kinds of defibrillators (e.g., an automated external defibrillator (AED)), and/or (d) remote support devices, such as a mobile phone or a head-mountable device (HMD), among other possibilities. Note that some items that are electronic may include one or more batteries to provide power to the item. These batteries may be rechargeable and may be recharged using one or more wired or wireless charging systems. In addition or on in the alternative, an item may be integrated with one or more batteries in the power system 521 for power.

In some embodiments, a UAV 500 could include an integrated system or device for administering or assisting in the administration of medical care (e.g., a system or device having one or more components that are built in to the structure of the UAV itself). For example, as noted above, a UAV could include an oxygen-therapy system. In an example configuration, an oxygen-therapy system might include a mask that is connected via tubing to an on-board oxygen source. Configured as such, the UAV could release the oxygen mask when it reaches a person in need of oxygen (e.g., at a fire scene).

As another example of a UAV with an integrated medical-support device, a UAV 500 might function as a mobile defibrillator. Specifically, rather than carry a stand-alone defibrillator that can then be removed from the UAV for use, the UAV itself may function as a defibrillator.

F. Service Modules

As noted above, UAV 500 may include one or more service modules 916. The one or more service modules 516 include software, firmware, and/or hardware that may help to provide or assist in the provision of the UAV-related services.

Configured as such, a UAV 500 may provide various types of service. For instance, a UAV 500 may have stored information that can be provided to a person or persons at the target location, in order to assist the person or persons in various ways. For example, a UAV may include a video or audio file with instructions for performing some task, which the UAV can play out to a person at the target location. As another example, a UAV may include an interactive program to assist a person at the target location in performing some task. For instance, a UAV may include an application that analyzes the person's speech to detect questions related to the medical situation and/or that provides a text-based interface via which the person can ask such questions, and then determines and provides answers to such questions.

In some embodiments, a UAV 500 may facilitate communication between a layperson and/or medical personnel at the scene and medical personnel at a remote location. As an example, a service module 516 may provide a user interface via which a person at the scene can use a communication system 520 of the UAV to communicate with an emergency medical technician at a remote location. As another example, the UAV 500 can unlock certain capabilities of a remote device, such as a mobile phone, which is near the UAV at the scene of a medical situation. Such capabilities may be inaccessible to a user of the remote device, unless the remote device is within a certain distance from the UAV such that the UAV can unlock the capabilities. For example, a UAV may send the remote device a security key that allows the remote device to establish a secure connection to communicate with medical personnel at a remote location. Other examples are also possible.

V. Example Inflatable Package Enclosures

Figure 6A:
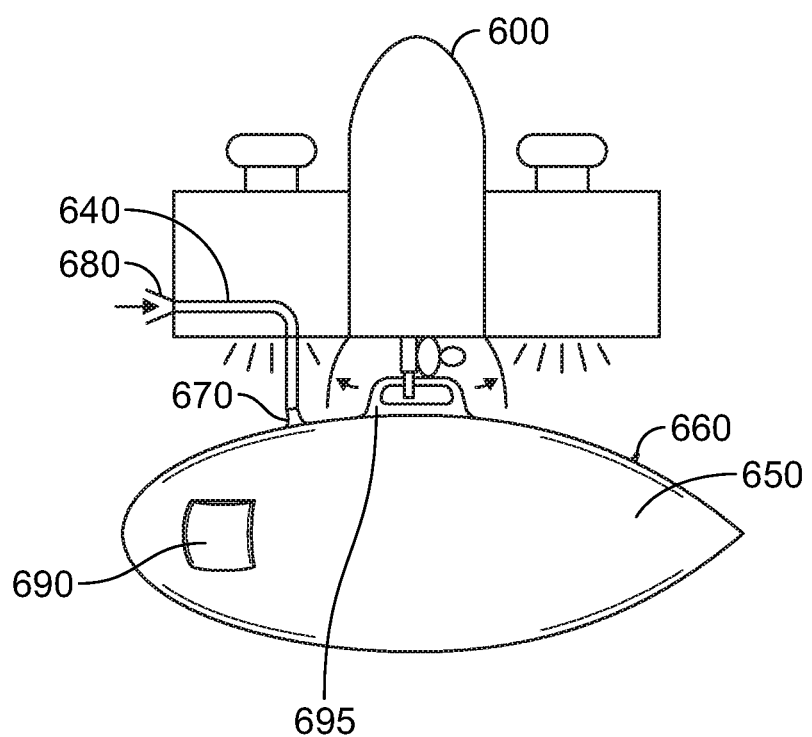
FIG. 6A is an illustration of a side view of unmanned aerial vehicle 600 having inflatable package enclosure 650 secured underneath unmanned aerial vehicle 600.

FIG. 6A shows example UAV 600 with inflatable package enclosure 650 secured underneath the UAV 600. In FIG. 6A, inflatable package enclosure 650 is shown in an inflated state, and UAV 600 is ready to deliver a package contained within inflatable package enclosure 650 to a desired delivery site. Inflatable package enclosure 650 may be inflated using a source of pressurized air through inflation valve 670, or may inflated manually using a device such as a hand or foot pump, or a bicycle pump.

Alternatively, as shown in FIG. 6A, the inflatable package enclosure 650 may be actively pressurized. The inflatable enclosure may be initially inflated as described above. Once airborne, an air duct 680 positioned on the UAV 600 may be in communication with inflation valve 670 through air hose 640. As the UAV 600 moves through the air, air passing through air duct 680 and air hose 640 on UAV 600 is forced through inflation valve 670 to actively pressurize inflatable package enclosure 650 to maintain the inflatable package enclosure in a properly inflated state. A bleed valve 660 is positioned on the inflatable package enclosure 650 to bleed air from the inflatable package enclosure 650 if the air pressure within the inflatable package enclosure 650 reaches a predetermined level to prevent over-inflation. The bleed valve 660 may be a passive valve that simply opens when the air pressure within the inflatable package enclosure reaches a predetermined level. Alternately, the bleed valve 660 may be controlled to open when an air pressure sensor within the inflatable package enclosure 650 senses a predetermined air pressure level.

As shown in FIG. 6A, the inflatable package enclosure 650 may include a handle 695 that may be used to secure the inflatable package enclosure 650 beneath the UAV 600. Preferably, the inflatable package enclosure 650 is secured at the center of lift of UAV 600. The handle 695 of package enclosure 650 provides for a firm attachment point to the UAV 600. Thus, the package enclosure may be rigidly secured to the exterior of the UAV 600 so that it does not shift during flight and adversely affect the flight dynamics of the UAV 600.

Alternate ways of securing the inflatable package enclosure 650 to the UAV 600 may also be used. For example, releasable strapping or lines could be used. The handle 695 could be attached to the end of a winch line positioned within the UAV 600 that may be used to lower the inflatable package enclosure 650 down to a delivery site, or could be attached to a release mechanism positioned within the UAV 600.

In addition, an exterior pocket 690 may be positioned on the exterior of inflatable package enclosure 650. Exterior pocket 690 may be similar to that used on letters or boxes that are mailed, and may be used to store information regarding the contents of the enclosure. The exterior pocket could also be used to enclose a contents identifier, an RFID tag for identifying the contents within the enclosure or delivery route, or other devices such as moisture meters, impact detectors, etc. to provide further information regarding the contents within the enclosure and/or flight characteristics.

Figure 6B:
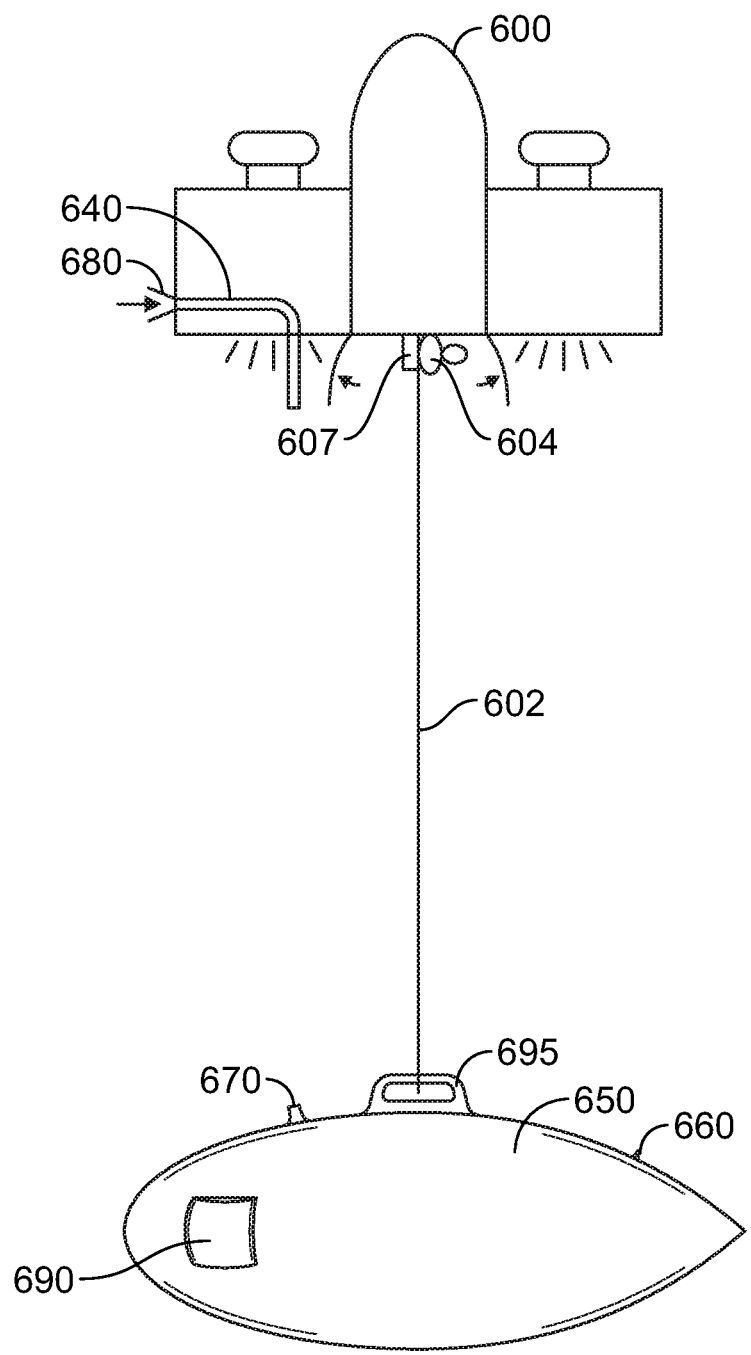
FIG. 6B is an illustration of a side view of unmanned aerial vehicle 600 having inflatable pack enclosure 650 suspended beneath unmanned aerial vehicle 650 and secured to winch line 602.

In FIG. 6B, the UAV 600 has reached its delivery destination and is positioned in a hover mode. In this embodiment, the UAV 600 includes a line-deployment mechanism or winch 604 having winch line 602 attached thereto. The winch line 602 has an end attached to handle 695 of inflatable package enclosure 650. Once at the delivery site, the winch line 602 may be lowered from UAV 600 to lower the inflatable package enclosure 650 and contents within to the ground. The inflatable package enclosure 650 may be lowered all the way to the ground, or lowered to a predetermined distance above the ground where the end of the winch line may include an automatic release mechanism that releases handle 695 and package enclosure 650 is thereafter dropped to the ground. In the latter case, the inflatable package enclosure 650 provides impact protection and cushioning for the contents within the inflatable package enclosure 650.

The inflatable package enclosure 650 may include an inertial measurement unit (IMU) that can provide measurements to the control system of the UAV 600, as during the descent of the package enclosure 650, windy conditions and other factors such as movement of the UAV 600 may affect the position of the inflatable package enclosure 650. The IMU could be contained within exterior pocket 690 or positioned elsewhere on the inflatable package enclosure 650. A line speed sensing mechanism 607 may also be used by the control system of the UAV 600 to control the descent of the inflatable package enclosure 650. As shown in FIG. 6B, as winch line 602 is lowered from UAV 600, the air hose 690 is decoupled from inflation valve 670 of inflatable package enclosure 650.

In other embodiments, a winch line may not be used. For example, the UAV 600 could land, and upon landing, the handle 695 of the inflatable package enclosure 650 could be automatically released from the UAV and the inflatable package enclosure 650 allowed to drop to the ground. Alternately, upon reaching a predetermined distance above the ground, the UAV 600 could hover over the delivery site, and the handle 695 of the inflatable package enclosure 650 could be automatically released from the UAV and the inflatable package enclosure 650 allowed to drop to the ground. In either case, the inflatable package enclosure 650 provides impact protection and cushioning for the contents within the inflatable package enclosure 650.

Figure 7:
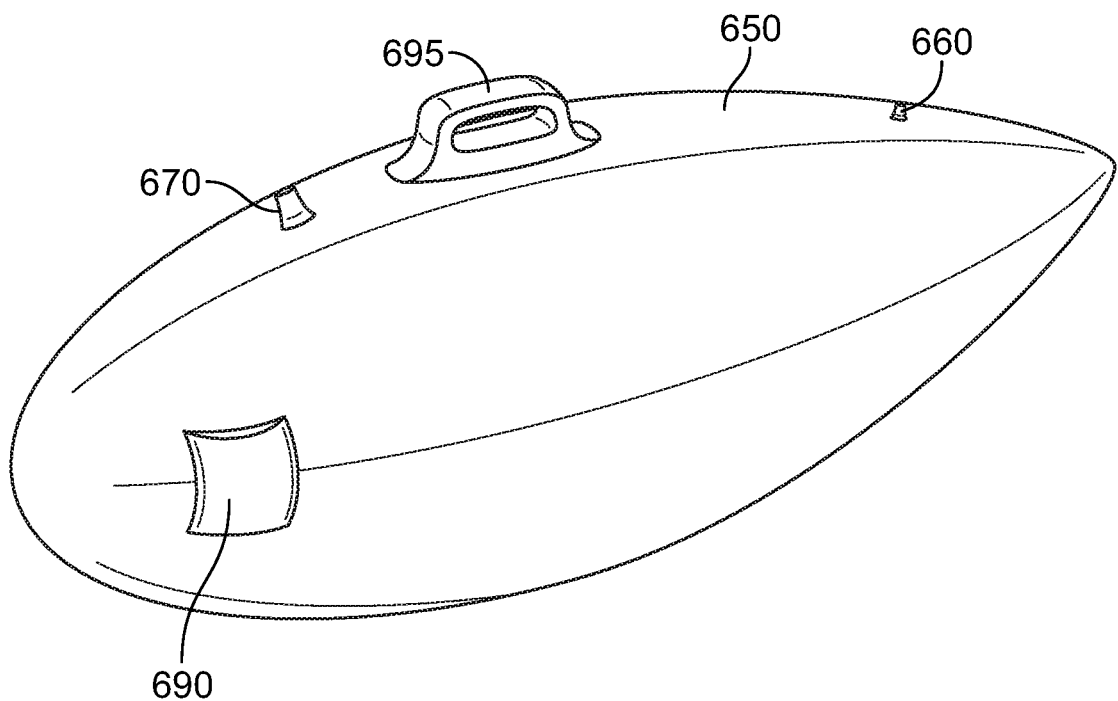
FIG. 7 is a perspective view of inflatable package enclosure 650.
Figure 8A:
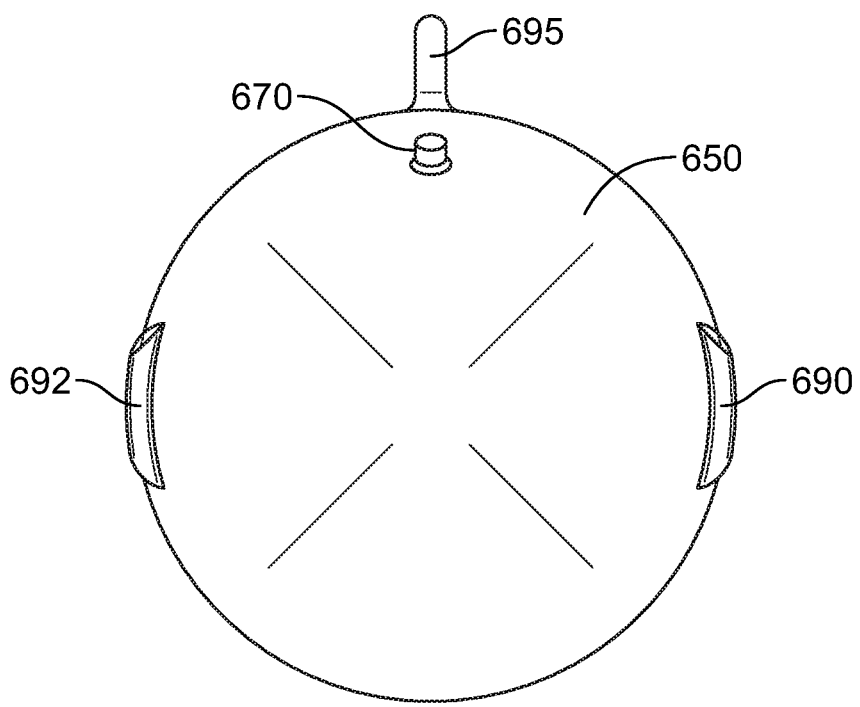
FIG. 8A is a front view of inflatable package enclosure 650 shown in FIG. 7.
Figure 8B:
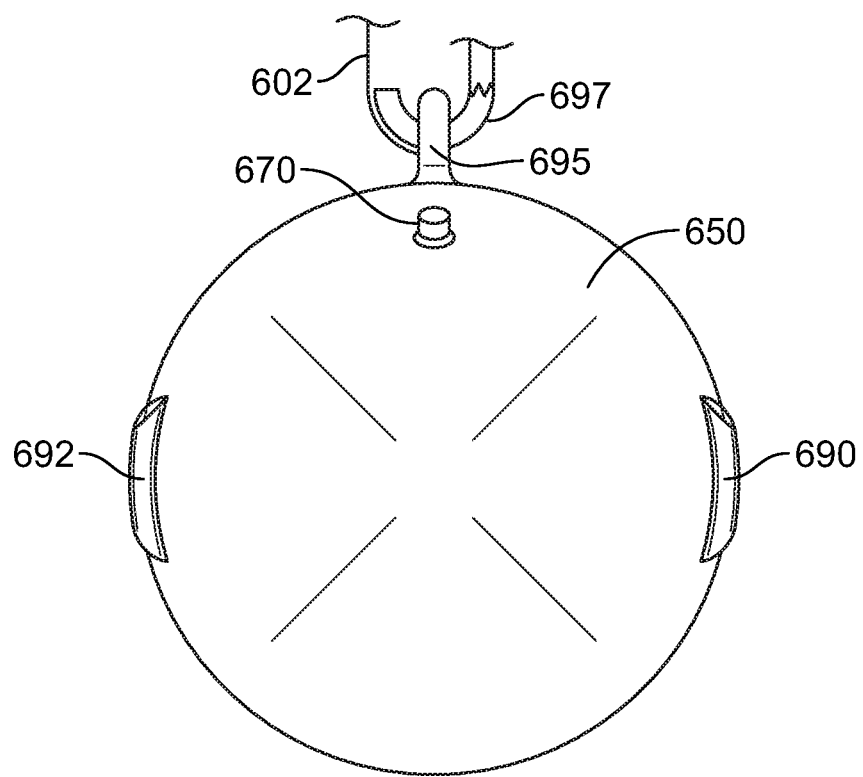
FIG. 8B is a front view of inflatable package enclosure 650 with a releasable hook shown secured to handle 695.

FIG. 7 is a perspective view of inflatable package enclosure 650 shown in FIGS. 6A and 6B. Inflation valve 670 is shown positioned in front of handle 695 and bleed valve 660 is shown positioned on a top rear end of the inflatable package enclosure 650. FIG. 8A is a front view of inflatable package enclosure 650 shown with exterior pockets 690 and 692 positioned on sides thereof. FIG. 8B is a front view of inflatable package enclosure 650 shown in FIG. 8B, shown with a releasable hook extending through handle 695. A rotatory or linear actuator or other device could be used to retract the releasable hook from the handle 695. One or more retractable pins may also be used to secure the handle 695 of the inflatable package enclosure 650 from the UAV 600 or end of winch line 602.

In addition, handle 695 may be advantageously shaped for use as an end user handle to allow the recipient of the inflatable package enclosure 650 to use the handle 695 to carry the package enclosure from the delivery site. The handle 695 could be made of plastic or cardboard, or other suitable material to allow a recipient to carry the package enclosure 650 and its contents from a delivery site.

Figure 9:
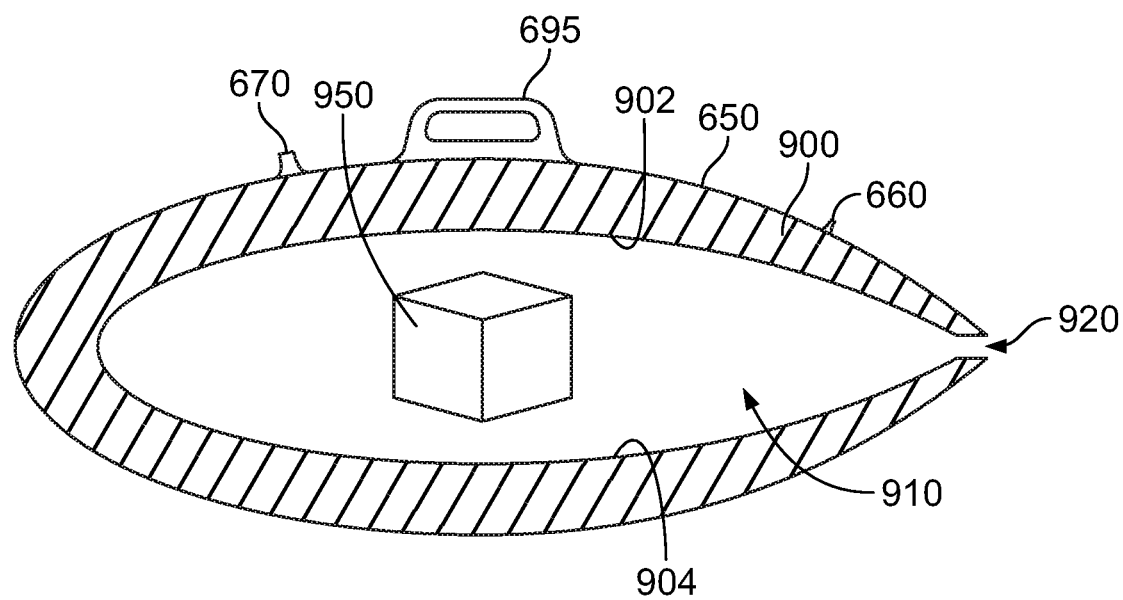
FIG. 9 is a side cross-sectional view of inflatable package enclosure 650 shown with inflatable exterior chamber 900 shown in a not fully inflated state and with package 950 positioned in cavity 910 within inflatable exterior chamber 900.

FIG. 9 is a cross-sectional view of inflatable package enclosure 650 shown in FIGS. 6-8B shown in a partially inflated state. In particular, an inflatable exterior chamber 900 is partially inflated and a package or cargo 950 is shown positioned within inner chamber or cavity 910 that is inside of exterior chamber 900. The package or cargo 950 may be inserted into the inner chamber or cavity 910 through rear opening 920 of the exterior chamber 900. As shown in FIG. 9, inner surfaces 902 and 904 surround the package or cargo 950.

Figure 10:
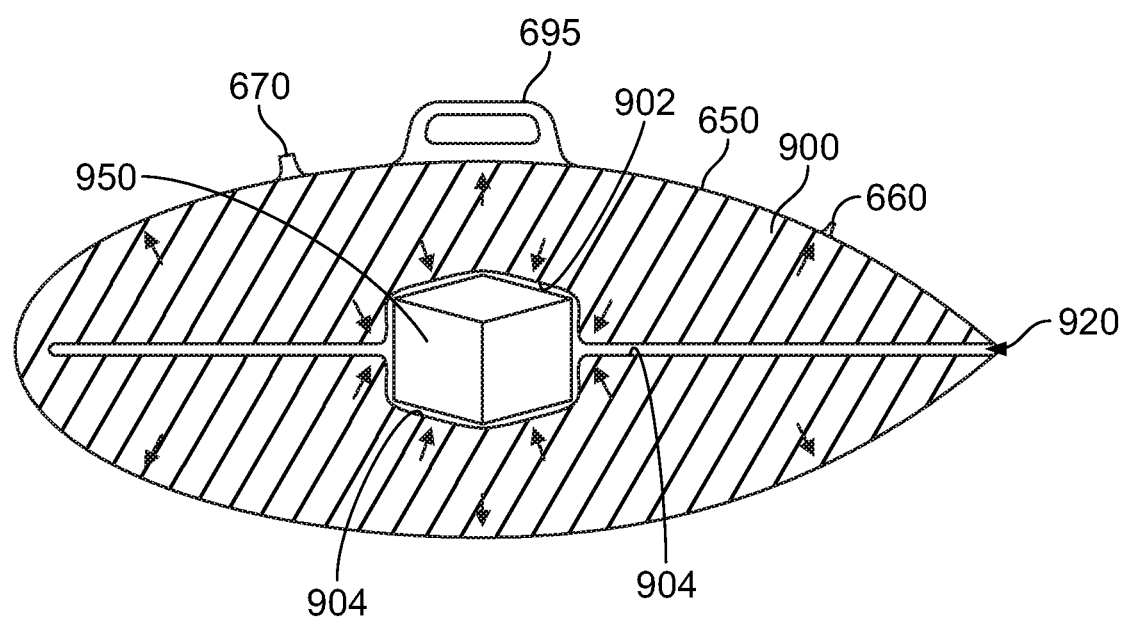
FIG. 10 is a side cross-sectional view of inflatable package enclosure 650 shown in FIG. 9 with inflatable exterior chamber 900 shown in a fully inflated state with package 950 secured within inflatable exterior chamber 900.

FIG. 10 is a cross-sectional view of inflatable package enclosure 650 after the inflatable exterior chamber has been fully inflated. Opening 920 is closed as the inflatable exterior chamber 900 inflates and exterior chamber 900 expands such that the inner surfaces 902 and 904 of the exterior chamber 900 conform to outer surfaces of the package or cargo 950 positioned within the exterior chamber 900. The inflated exterior chamber 900 is pressurized (as reflected by the small arrows inside the exterior chamber 900) forcing the inner surfaces 902 and 904 to maintain the package or cargo 950 in a secured position therein, and also to have the inflatable package enclosure 650 to take on a rigid shape.

The exterior chamber 900 can be created out of any airtight film such as polyurethane film. The exterior chamber 900 may be formed by heat sealing together sections of the film to create the airtight exterior chamber 900. Other methods could also be used such as sewing together adjacent sections and sealing the sewn areas to render them airtight. The airtight film preferably has elastic properties that allow for the film to stretch and expand as it is inflated. Furthermore, the airtight could be made of a biodegradable material, such as a corn-based material, to provide for environmentally friendly disposal of the exterior chamber at the end of its useful life. In addition, a textile or fabric, such as ripstop nylon, could also be used to form the exterior chamber 900. The textile or fabric could be coated with a sealing material such that the textile or fabric is airtight. Even paper could be used to form the exterior chamber 900, similar to a paper lantern concept.

The pressurized inflatable package enclosure 650 will hold package or cargo 950 firmly in place. The inflated exterior chamber 900 provides an air space around the package or cargo 950 within the inflated exterior chamber 900 that will provide thermal insulation for the package or cargo 950 within the exterior chamber 900, as the package enclosure 650 may be subjected to large temperature ranges during transport. The inflated package enclosure 650 will also provide protection to the package or cargo 950 from impact, when the inflated package enclosure is released or lowered from the aircraft or UAV 650 to the ground by cushioning the package or cargo 950. When the exterior chamber 900 is inflated, the outer form of the package enclosure 650 advantageously take the form of a rigid aerodynamic body. When deflated, the package enclosure 650 will take up very little volume and space.

As noted above, when a package enclosure is carried outside of the aircraft or UAV 600, there are a series of packaging challenges that need to be addressed. The package enclosure beneath the aircraft or UAV 600 creates aerodynamic drag on the system. The outer mold line of the package needs to be carefully formed to minimize its aerodynamic impact to minimize effects on the flight characteristics of the UAV 600. A traditional rectangular box creates an undesirable amount of drag and effect on the flight characteristics of the UAV 600. Accordingly, the present embodiments provide for an aerodynamic exterior for the inflated package enclosure 650. In particular, the cross-section of the package enclosure 650 may have the shape of an air foil. Other aerodynamic cross-sectional shapes may also be used for the package enclosure 650, such as where the shape and form minimizes drag for a given frontal area. Furthermore, the pressurized exterior chamber 900 holds the package or cargo 950 firmly in place within the package enclosure 650, preventing the package or cargo from shifting during transport and delivery, as shifting of the package or cargo 950 will adversely affect the UAV's balance which will affect its flight dynamics.

The package enclosure 650 serves to protect the package or cargo 950 from the environment during transport and delivery. For example, the package enclosure 650 serves to protect the package or cargo 950 from temperature variations, moisture, dirt, insects, impact, etc. that may be encountered during transport and delivery.

Figure 11:
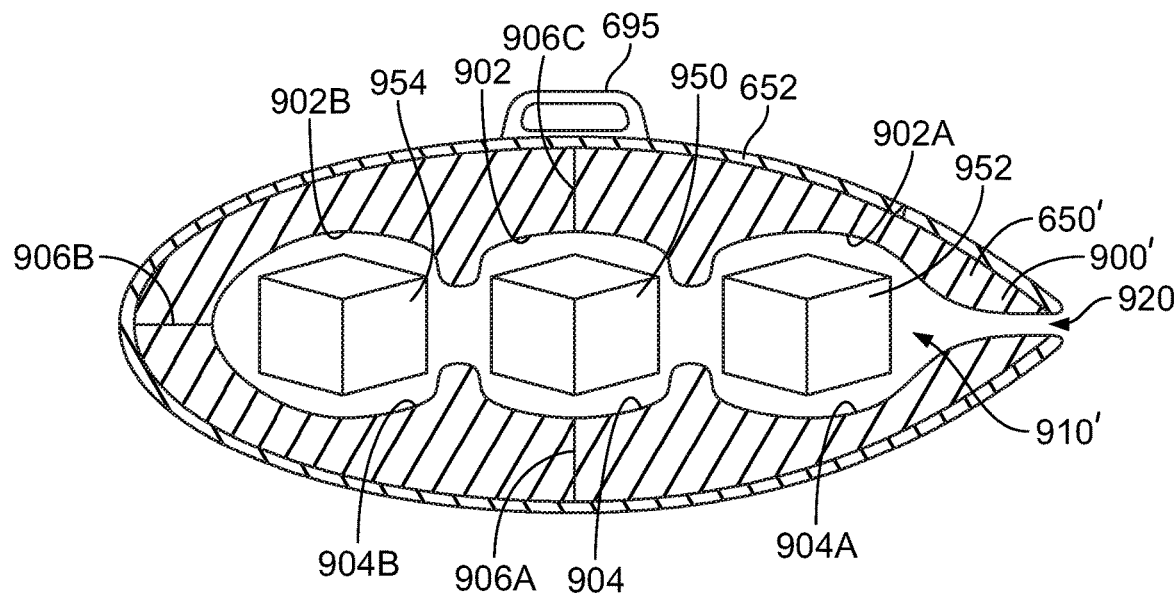
FIG. 11 is a side cross-sectional view of inflatable package enclosure 650' shown with inflatable exterior chamber 900' shown in a not fully inflated state and with packages 950, 952, and 954 positioned in cavity 910' within inflatable exterior chamber 900'.

Given that the package enclosure 650 may be dropped to the ground during delivery, it is desirable to provide a package enclosure that is durable enough to withstand the impact and safely contain the package or cargo 950 positioned therein. In FIG. 11, an inflatable package enclosure 650' is provided that includes inflatable exterior chamber 900' that is shown partially inflated. In this embodiment, the exterior chamber 900' includes a fabric or textile covering 652. The fabric or textile covering 652 provides protection from abrasions or sharp objects encountered on the ground that could cause leaks or holes to form in the exterior chamber 900'. Such a fabric or textile covering 652 also may extend the useful life of the package enclosure 650, allowing it be a reusable package enclosure, thereby saving costs and reducing the amount of material disposed of.

In the embodiment of FIG. 11, the exterior chamber 900' includes a plurality of cavities therein adapted to enclose and secure packages 950, 952, and 954. In particular, Package 950 is positioned in a cavity surrounded by inner surfaces 902 and 904 of exterior chamber 900', package 952 is positioned in a cavity surrounded by inner surfaces 902a and 902b of exterior chamber 900', and package 954 is surround by inner surfaces 902b and 902c of exterior chamber 900'. Packages 950, 952, and 954 may be inserted into the cavities of exterior chamber 900' through rear opening 920 of exterior chamber 900'. The use of a plurality of cavities allows for a plurality of packages to be contained with the package enclosure 650'.

Figure 12:
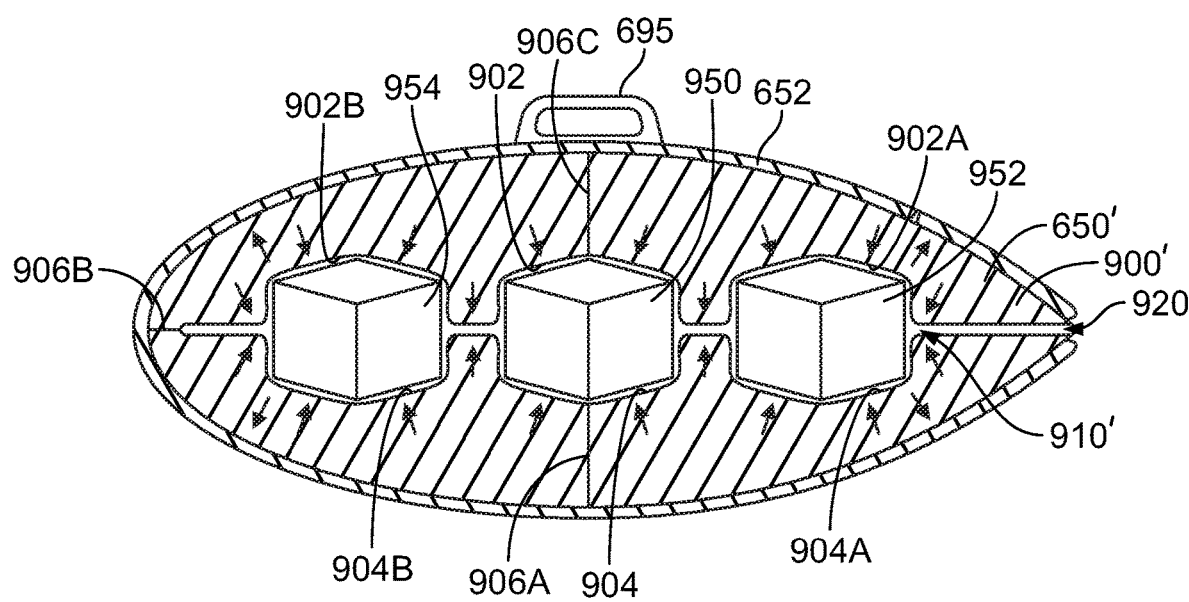
FIG. 12 is a side cross-sectional view of inflatable package enclosure 650' shown in FIG. 11 with inflatable chamber 900' shown in a fully inflated state with packages 950, 952, and 954 secured within inflatable exterior chamber 900'.

FIG. 12 is a cross-sectional view of inflatable package enclosure 650' after the inflatable exterior chamber 900'has been fully inflated. Opening 920 is closed as the inflatable exterior chamber 900' inflates and exterior chamber 900' expands such that the inner surfaces 902 and 904 conform to outer surfaces of the package 950, inner surfaces 902a and 904a conform to the outer surfaces of package 952, and inner surfaces 902a and 902b conform the outer surfaces of package 954 positioned within the exterior chamber 900.' The inflated exterior chamber 900' is pressurized (as reflected by the small arrows inside the exterior chamber 900') forcing the inner surfaces 902a-c and 904a-c to maintain the packages 950, 952, 954 in a secured position therein, and also to have the inflatable package enclosure 650' to take on a rigid shape.

In FIGS. 11 and 12, exterior chamber 900' may advantageously be sectioned to provide a plurality of inflated sections of exterior 900', such that if there is a failure in one section of the inflatable package enclosure, only a single section would become deflated, and the remaining sections would remain intact to maintain the package within the enclosure and retain an aerodynamic shape. In particular, sections walls 906a-d are provided in exterior chamber 900' to section the exterior chamber 900' into four separately inflated sections.

The inflatable package enclosures 650 and 650' shown in FIGS. 6A-12 provide a number of advantages over conventional payload designs. In particular, the inflatable package enclosures 650 and 650' provide for a large aerodynamic volume using a minimal amount of material, such that when deflated the inflatable package enclosure packs extremely flat. In particular, as shown in FIG. 13, when the exterior chamber 900' is deflated, the package enclosure 650' lies flat. As a result, a large number of uninflated package enclosures may be contained in a single box when shipped to a UAV transport center used to transport packages.

The inflatable package enclosures 650 and 650' use air for both structure and insulation. The use of air in this manner allows the package enclosures to be rigid and thermally insulated without having to carry wasteful insulation or structural material. This reduces flight mass, packaging cost, storage space required, and material that gets disposed of.

Furthermore, using an inflatable package enclosure allows the aircraft/package system to have an optimal exterior form for aerodynamic efficiency (which reduces energy needed to power the aircraft) with limited weight, while simultaneously allowing the packaging to be extremely minimal for both merchant storage and end user disposal.

In addition, the inflatable package enclosure provides thermal insulation for the contents of the enclosure and also provides impact protection for the contents of the enclosure upon delivery to the ground. Further, the inflatable package enclosure actively holds the contents of the enclosure in place within the enclosure.

VI. Example Method of Securing a Package For Delivery With a UAV

A method 1400 of securing a package for delivery with an aerial vehicle is also provided, including the step 1402 of providing an inflatable package enclosure for use on an aerial vehicle including an inflatable exterior chamber, a first inner cavity positioned within the inflatable exterior chamber, and an inflation valve positioned on the inflatable exterior chamber; the step 1404 of positioning a package to be delivered within the first inner cavity; the step 1406 of inflating the inflatable exterior chamber such that inner surfaces of the inflatable exterior chamber conform to outer surfaces of the package to be delivered, the step 1408 of securing the inflatable package enclosure to the aerial vehicle, and the step 1410 of delivering the package with the aerial vehicle.

VII. Conclusion

While various aspects of the disclosure have been disclosed herein, other aspects and embodiments will be apparent to those skilled in the art. Accordingly, the embodiments disclosed herein are for purposes of illustration, and are not intended to be limiting, with the true scope of the disclosure being indicated by the following claims.

What is claimed is:

1. An inflatable package enclosure secured to an aerial vehicle, the inflatable package enclosure comprising:
   an inflatable exterior chamber having inner surfaces;
   an inner cavity positioned within the inflatable exterior chamber; and
   an inflation valve positioned on the inflatable exterior chamber;
   wherein when a package is positioned in the inner cavity, the inner surfaces of the inflatable exterior chamber move inwardly during inflation of the inflatable exterior chamber to conform to outer surfaces of the package to secure the package within the inflatable exterior chamber;
   wherein the inner surfaces of the inflatable exterior chamber accommodate packages of various sizes and shapes;
   wherein the inflatable exterior chamber further includes a handle having an aperture, the handle being attached to a top of the inflatable exterior chamber, the handle being releasably secured to the aerial vehicle via the aperture positioned in the handle; and
   wherein the aerial vehicle includes an air duct which is in communication with an air hose that extends within the aerial vehicle and then extends downwardly outside of the aerial vehicle to the inflation valve on the inflatable exterior chamber such that air from outside the aerial vehicle flows through the air duct and the air hose of the aerial vehicle and then downwardly through the air hose positioned outside the aerial vehicle to provide active pressurization of the inflatable exterior chamber as the aerial vehicle moves through the air.

2. The inflatable package enclosure of claim 1, wherein a layer of fabric having an inner surface is positioned over an outer surface of the inflatable exterior chamber, such that the inner surface of the layer of fabric is secured to and conforms to the outer surface of the inflatable exterior chamber.

3. The inflatable package enclosure of claim 2, wherein the fabric comprises ripstop nylon.

4. The inflatable package enclosure of claim 1, further including a passive bleeder valve such that when air pressure within the inflatable exterior chamber exceeds a predetermined level, air is allowed to escape the inflatable exterior chamber through the passive bleeder valve to control the air pressure.

5. The inflatable package enclosure of claim 1, wherein the inflatable exterior chamber includes a plurality of separately inflatable sections.

6. The inflatable package enclosure of claim 1, wherein the inner cavity comprises a plurality of cavities positioned within the inflatable exterior chamber.

7. The inflatable package enclosure of claim 1, wherein a cross-section of the inflatable exterior chamber when inflated has a rounded shape.

8. The inflatable package enclosure of claim 1, wherein an outer surface of the inflatable exterior chamber has a rounded shape that reduces drag on the exterior chamber.

9. The inflatable package enclosure of claim 1, wherein air within the inflatable exterior chamber provides thermal insulation to a package when the package is positioned within the inflatable exterior chamber when inflated.

10. The inflatable package enclosure of claim 1, wherein air within the inflatable exterior chamber provides impact protection to a package when the package is positioned within the inflatable exterior chamber when inflated.

11. The inflatable package enclosure of claim 1, wherein the inflatable exterior chamber comprises a biodegradable material.

12. The inflatable package enclosure of claim 1, wherein an exterior pocket is positioned on an outer surface of the inflatable exterior chamber.

13. The inflatable package enclosure of claim 12, wherein the exterior pocket contains one or more of a package content information document, a tracking device, an RFID tag, a moisture meter, and an impact meter.

14. A method of securing a package for delivery with an aerial vehicle, comprising the steps of:
    providing an inflatable package enclosure for use on an aerial vehicle comprising:
       an inflatable exterior chamber having inner surfaces;
       an inner cavity positioned within the inflatable exterior chamber; and
       an inflation valve positioned on the inflatable exterior chamber;
       wherein when a package is positioned in the inner cavity, the inner surfaces of the inflatable exterior chamber move inwardly during inflation of the inflatable exterior chamber to conform to outer surfaces of the package to secure the package within the inflatable exterior chamber;
       wherein the inner surfaces of the inflatable exterior chamber accommodate packages of various sizes and shapes;
       wherein the inflatable exterior chamber further includes a handle having an aperture, the handle being attached to a top of the inflatable exterior chamber, the handle being releasably securable to the aerial vehicle via the aperture positioned in the handle;
    positioning a package to be delivered within the inner cavity;
    inflating the inflatable exterior chamber such that the inner surfaces of the inflatable exterior chamber conform to outer surfaces of the package to be delivered;
    securing the inflatable package enclosure to the aerial vehicle;
    wherein the aerial vehicle includes an air duct which is in communication with an air hose that extends within the aerial vehicle and then extends downwardly outside of the aerial vehicle to the inflation valve on the inflatable exterior chamber such that air from outside the aerial vehicle flows through the air duct and the air hose of the aerial vehicle and then downwardly through the air hose positioned outside the aerial vehicle to provide active pressurization of the inflatable exterior chamber as the aerial vehicle moves through the air; and channeling air through the air duct and the air hose in the aerial vehicle as the aerial vehicle moves through the air into the inflation valve to provide active pressurization of the inflatable exterior chamber; and
delivering the package with the aerial vehicle.

\* \* \* \* \*